2,996,395
EMULSION PAINTS

Kenneth E. Jackson, Bethel, Pa., assignor to Esso Research and Engineering Company, a corporation of Delaware
No Drawing. Filed Mar. 30, 1954, Ser. No. 419,927
11 Claims. (Cl. 106—142)

This invention relates to coating compositions and more particularly to water paints having exceptionally good resistance to washing.

A primary object of the invention is to provide a coating composition of the water-thinnable type which may be sold either as a paste or in its final consistency and, if desired, may have incorporated therewith suitable pigments, fillers, and the like of well-known composition. The main purpose is the production of a paint having a greater degree of washability after drying than has hitherto been produced.

One of the outstanding features of this invention resides in the application of a synthetic hydrocarbon drying oil to the emulsion paint field in which it has never before been employed.

The present invention is applicable most particularly to the production of what have come to be known in the art as emulsion paints, sometimes being termed resin emulsion paints. These consist of an aqueous continuous phase, usually containing dissolved therein certain colloidal materials such as gums or proteins, particularly the latter, in which continuous aqueous phase there is dispersed, in the form of discrete and individual minute droplets, an oily or hydrophobe phase, usually spoken of as the disperse phase of the emulsion. In addition to this hydrophobe disperse phase, there are usually also present fillers, pigments and modifying agents, which lend to the coating composition certain of their desirable characteristics, such as color, hiding power, tenacity of adhesion to the painted base, flexibility, light reflectivity, etc. It has already been proposed in the past to incorporate with the so-called water-thinnable paints certain hydrophobe materials such as oils or resins which, upon the application of such a paint to a given surface, will form thereon a film in which the pigments and fillers become embedded upon the drying of the film. In the case of paints which were devoid of a hydrophobe constituent, insolubility was sometimes imparted by the presence of more or less volatile solvents such as ammonia or by the use of solvents such as lime, which—while they solubilized certain of the proteins such as casein, vegetable protein, and the like—eventually reacted therewith to form a more or less water-resistant film. Such paints, however, usually did not show any great degree of resistance to washing, particularly under the effects of attrition, as when scrubbing them to clean them; and in the past, resort has been had to the use of hydrophobe materials which, by becoming incorporated in a colloid film such as the protein, gave them more or less resistance to washing. For this purpose there have been used various types of natural and synthetic resins either alone or in combination with oils, or in the form of resin-oil combinations generally known as varnishes, or combinations of synthetic resins which might themselves be modified so as to have drying characteristics, or which have been combined with oils having such characteristics.

It has now been found that by using in an emulsion paint, a synthetic hydrocarbon polymer drying oil, there will be produced an excellent form of water-thinnable paint which exhibits remarkable resistance to washing and scrubbing and will not materially change in color.

The synthetic drying oils of this invention are obtained by copolymerizing 60 to 100 parts of butadiene-1,3 with 40 to 0 parts of styrene, preferably about 75 to 85 parts of the former and 25 to 15 parts of the latter, the polymerization being carried out at 20 to 100° C., preferably below the melting point of the catalyst or between 65 and 85° C., in a reaction diluent. Temperatures near the lower end of the range set forth are generally more suitable for batch polymerizations and temperatures near the upper end of the range are particularly suited for continuous operation. As a polymerization catalyst about 0.1 to 10 parts, preferably about 1 to 3 parts of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 and 120° C. or straight run mineral spirits such as Varsol (boiling range 150 to 200° C.), inert hydrocarbon diluents such as butane, xylene, benzene, toluene, cyclohexane or the like, individually or in admixture with each other. To be suitable for the polymerization reaction here involved, the diluents should have a boiling range within the limits of about −15° C. and 200° C. The diluents are usually used in amounts ranging from 50 to 500, preferably 200 to 300 parts per 100 parts of monomers.

Instead of using inert diluents, it is also possible to use modifying diluents such as butene-2- or other low boiling olefins which modify the reaction by limited copolymerization and chain termination. Various ethers having more than two carbon atoms per molecule such as diethyl ether, diisopropyl ether dioxane, vinyl ethyl ether, vinyl isopropyl, vinyl isobutyl ether, anisole, phenetole and other ethers of various types are also useful as diluents and are particularly helpful as co-diluents to insure formation of colorless products when used in amounts ranging from about 10 to 35 parts per 100 parts of monomers, together with the aforesaid amount of inert diluent such as solvent naphtha, p-dioxane, m-dioxane, and their various methyl and ethyl homologues are particularly preferred. In selecting the ether co-diluent it is especially desirable to select an ether having a boiling point at least 10° C. below the lower limit of the boiling range of the hydrocarbon diluent and thus, when using Varsol, ether co-diluents boiling between about 25 and 140° C. are preferred in order to permit its ready recovery from the polymerized reaction mixture.

Other means of modifying the properties of the polymer product involve the substitution of all or at least part of the butadiene feed with other diolefins such as isoprene, 2,3-dimethyl butadiene-1,3, piperylene or 2-methyl pentadiene-1,3. Likewise, styrene may be replaced by its various ring-alkylated homologues such as the various methyl styrenes, dimethyl styrenes, ethyl styrenes or diethyl styrenes. In particular, it is desirable to add the styrene monomer to the reaction mixture only after the polymerization of the butadiene has been initiated. By this expedient, the induction period is quite substantially reduced, and the polymer produced is gel-free and of desirably low viscosity as opposed to a more viscous product obtained when the styrene monomer is present in the reaction mixture from the beginning.

Especially where a coarse dispersion of sodium is used as catalyst, it is also advantageous to use about 1 to 50%, preferably 10 to 20% based on sodium of a $C_1$ to $C_5$ aliphatic alcohol. Secondary and tertiary alcohols, particularly isopropanol or tertiary butanol are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 100° C. with a catalyst particle size of less than 100 microns diameter. While sodium is preferred similar catalysts such as potassium, sodium hydride, and various alloys of sodium are also useful. Agitation of the reaction mixture during synthesis increases the efficiency of the catalyst. Conversions of 50 to 100% on monomers can be accomplished fairly readily in batch-type as well as in continuous polymerizations, although the catalyst requirements are twice or three times greater for continuous operation than for a batch operation and equal conversion.

Destruction of catalyst at the end of the reaction is effectively accomplished by adding to the reactor a moderate excess of alcohol, e.g. 100% excess of isopropanol based on sodium, and agitating at the reaction temperature for another half hour or so. After destruction of the residual sodium by alcohol the crude product containing the alcoholate, excess alcohol and other solid impurities is cooled, neutralized with dry carbon dioxide, glacial acetic acid or other preferably anhydrous acid which does not affect the polymer, and the neutralized product is then filtered with a filter aid such as silica gel, clay, charcoal or its equivalent.

In the preferred modification the clear colorless filtrate is then fractionally distilled to remove first the alcohol-hydrocarbon azeotropes and then the dioxane-hydrocarbon azeotropes. Finally, if the polymerization is carried out in a relatively large amount of hydrocarbon diluent so that the resulting polymer solution is too dilute for use as a varnish or enamel base, it is desirable to distill off additional hydrocarbon until a product containing the desired non-volatile matter is obtained e.g. 50–90% N.V.M., the non-volatile matter being the polymeric drying oil. The resulting product, being a solution of polymeric drying oil in a suitable hydrocarbon solvent such as solvent naphtha or mineral spirits, is a clear colorless varnish composition having a viscosity between about 0.5 and 5 poises at 50% non-volatile matter. The Staudinger molecular weight of the non-volatile or polymeric constituents of the product usually falls between about 2,000 to 5,000, corresponding to an intrinsic viscosity of about 0.15 to 0.3.

For the purposes of this invention it is generally desirable to strip most of the solvent off leaving a non-volatile content of about 75 to 95% N.V.M.

The synthetic drying oil, may, if desired, form the sole hydrophobe constituent of the emulsion paints; or it may be used in combination with resins, both natural and synthetic; or it may be used in the form of varnishes made by "cooking" it with natural or synthetic resins. The resins employed may be of the type known as alkyd resins, but the invention is equally applicable to the use of polymer drying oil in combination with phenolic resins and other synthetic materials now known as well as with natural resins. The resins may be dissolved in the drying oil either in the cold or with the aid of heat; or an emulsion may be made of the resin with the aqueous colloidal medium, to which there may be then added drying oil, the combination or mutual solution of the two hydrophobe constituents then taking place upon the drying of the paint as the result of the evaporation of the water therefrom. Of course, the order of addition which is mentioned might well be reversed, and the polymer drying oil might be first emulsified with the aqueous phase of the emulsion and the resins thereafter likewise emulsified in the medium. In other words, what it is intended to imply by this statement is that the invention is broadly directed to coating compositions of the water-thinnable type which comprise the synthetic polymer drying oil.

In order to prepare the emulsion paint in accordance with the invention three steps are taken. The first step consists in preparing a dispersion of a protective colloid. Particularly applicable to the present invention are the proteins which are normally insoluble in water, such as vegetable proteins—for example, the alpha protein made from soybeans—and also that phosphoprotein known as casein, which is derived from milk. In using them, such proteins are dissolved in water with the aid of slightly alkaline-reacting so-called solvents, exemplified by borax, soluble phosphates, soluble silicates, alkaline reacting salts, and alkali or ammonium hydroxides and amines.

Dispersions of proteins in water are usually prepared separately from the emulsion by using any of the usual "cutting" or dispersing methods and reagents. However, since the alkalies generally used for such purposes ultimately are deposited in the dry film of coating composition and impair its water resistance, it is preferred to use as little of such alkalies as possible and to supplement such alkalies with hydroxy amines. The dispersions may be made up to contain from about 17½% to 18% total solids, with about 14% protein, but more or less concentrated dispersions may be employed since the concentration thereof only affects the amount of water which is added otherwise in applying the completed emulsion. The total weight of protective colloid should preferably not be greater than about one-sixth of the weight of the film-forming materials. Such large concentrations are seldom necessary in a system to effect the necessary stabilization of the emulsion and it is preferred to keep the concentration as low as practicable to provide sufficient stability. As little protein colloid as 5% by weight of the varnish may frequently be adequate for this purpose, but it is generally preferred to use between about 8% and 12% on a weight basis.

The second step consists in the addition of pigment to the protective colloid. In formulating the emulsion enamels and paints, it is desirable to obtain maximum hiding with as little pigment as possible, and, therefore, it is desirable to use high-hiding pigments. Titanium dioxide is such a pigment and is very satisfactory, particularly because it is also a relatively inert pigment. In brief any pigment commonly used in paint and which is not alkali-reactive is suitable. It is preferred to use pigments such as lithopone, titania, cadmium sulfide colors, cadmium sulfo-selenide colors, iron oxide colors and ultramarine blues, and as indicated, the high-hiding pigments of these classes and types are preferred particularly. Inert fillers may also be used for their usual purpose as bulking agents, but for most uses of the emulsion enamels of this invention the presence of fillers merely dilutes the effectiveness of the high-quality high-hiding prime pigments.

The emulsion enamels of the invention are pigmented in respect to the polymer oil or film-former content in about the same proportions customarily used in oil paint enamels; that is, a pigment to varnish ratio of up to about 1 volume of pigment to about 1 volume of film-former may be employed. If lower specular gloss is desired, then the ratio of pigment to film-forming material may be increased. Finely-ground dry pigment may be used to advantage since emulsions prepared with such pigment may be packaged directly after subjecting the emulsion paint to a fast grinding operation designed merely to break up coarse pigment agglomerates. If the pigment is finely ground in paint mills as for oil enamels, then higher ratios of pigment in a ball mill to film-former may be used for a given specular gloss. For example, the mixture of pigment and emulsion may be ground for from 4 to 16 hrs. in order to completely disperse all the pigment agglomerates.

The third step is the addition of a mixture of the synthetic polymer oil, paint driers, and fatty acid to the previous mixture. The paint driers are added to speed the "set" of the paint film. They may be any of the commonly used metallic soaps of organic acids, such as cobalt, manganese, or lead naphthenates. The fatty acid is included for reaction with the amines that were added in the first step to form soaps, which are emulsifying agents and may be any of the common higher fatty acids, e.g. oleic, linoleic, stearic, palmitic, etc. or mixtures thereof. The whole mixture is stirred with a high-powered stirrer until maximum viscosity is reached and a smooth emulsion paste is achieved. This paste can then be further reduced with water to any suitable application viscosity.

The invention is illustrated by the example described below.

Example 1

A protective colloid mixture was prepared having the following composition:

|  | Pts. by wt. |
|---|---|
| Casein | 30 |
| Water | 100 |
| Mixed ethanol-amines | 10 |
| Total wt | 140 |

The casein was first wet with water, the amines added and stirred until the casein was dissolved. Hydroxy amines were included in this mixture to stabilize the casein. To this mixture was then added 200 parts of water, 534 parts of Ponolith and 159 parts of titanium dioxide pigment. The mixture was stirred until the pigments were thoroughly wet.

The following mixture was then added while stirring:

|  | Pts. by wt. |
|---|---|
| Synthetic hydrocarbon drying oil [1] (90% N.V.M.) | 220 |
| Xylene | 50 |
| Cobalt naphthenate | 1 |
| Oleic acid | 12 |
| Lead naphthenate | 1 |
| Total wt | 284 |

[1] A polymer oil having a viscosity of 1.5 poises at 50% N.V.M. in Varsol prepared from the following recipe:

|  | Parts by wt. |
|---|---|
| Butadiene | 80 |
| Styrene | 20 |
| Varsol | 200 |
| Isopropanol | 0.2 |
| Dioxane | 20 |
| Sodium | 1.5 |

Temperature, 50° C.

The mixture was stirred with a high-powered stirrer until a smooth emulsion paste was achieved. The resulting paste was reduced with water (2 parts paste to 1 part water) to thin it for application.

These copolymer paints showed excellent resistance to scrubbing by the Gardner Washability Test. The washability test was conducted according to Method 614.2 of Federal Specification TT-P-141B. Briefly, this test requires that the emulsion paint paste be diluted with water and a film laid down on a ground glass plate. The film is allowed to air-dry for 6 days at 23° C. ±1.1° C. and 50%±4% relative humidity, then baked 24 hours at 140° F. ±4° F. The film is then subjected to the scrubbing action of a 1-pound weighted brush saturated with 0.5% Ivory Flake soap solution. Additional soap solution is slowly dropped onto the panel to keep the film surface wet during the test.

When the color of the substratum upon which the paint has been applied becomes visible to the extent of about half of the painted surface, the test is considered completed and a record is then made of the number of oscillatory strokes of the brush which were required to effect the removal of the given amount of paint. Obviously, therefore, the greater the number of strokes required, the better the resistance to washing or the better the degree of washability of the paint. With this explanation, the following table will become self-explanatory.

| Coating: | Brush Strokes |
|---|---|
| Emulsion paint prepared according to Example I | More than 4000. |
| First commercial butadiene-styrene latex emulsion paint | Less than 100. |
| Second commercial butadiene-styrene latex emulsion paint | 90 to 110. |

From the above data it is seen that the synthetic hydrocarbon polymer drying oil produced a paint with greatly increased washability over regular commercial styrene-butadiene latex paints.

In the above formula, vegetable proteins such as soybean protein may be substituted for the casein, and the solvents employed may comprise borax or other alkali utilized with or without sodium stannate or other alkali salt of an amphoteric metal as a stabilizer.

No particular novelty is claimed for the aqueous component of the present paint formulations, in which however novelty resides primarily in the utilization of the polymer oil, either alone or conjointly with natural or synthetic resins or resinous condensation products.

It will, of course, be obvious that the quantities and kinds of pigment shown in the examples may vary very widely, depending upon the color desired. In the case of color, certain colored pigments or even color lakes may be used.

Except for such equivalents as may occur to those skilled in the art and the adoption of such mechanical expedients as mixers, paint mills etc. to insure adequate and uniform admixture of the various ingredients, what is claimed as new and useful and desired to be secured by Letters Patent is:

1. A coating composition in the form of an emulsion comprising an aqueous solution of a protein as the continuous phase, and a hydrophobe disperse phase comprising as its predominant ingredient a liquid sodium polymer of butadiene, which composition is characterized by forming a water washable dry coating.

2. An emulsion of a polymeric material in an aqueous medium containing solubilized casein and an amine-fatty acid soap as an emulsifier, the predominant ingredient of said polymeric material being a liquid sodium copolymer of 60 to 100% butadiene-1,3 and 40 to 0% of styrene.

3. An emulsion in accordance with claim 2 in which the protective colloid is in the range of 5% to 16⅔% based on the weight of the copolymer oil.

4. A process for preparing a stabilized coating composition which comprises the steps of preparing a dispersion of a protein in an alkaline medium, and thereafter adding a mixture of a liquid sodium polymer of butadiene and a higher fatty acid and agitating until an emulsion is formed.

5. Process according to claim 4 in which the protective colloid is a protein.

6. Process according to claim 5 in which the protein is present in an amount between 5% and 16⅔% by weight of the liquid polymer.

7. Process according to claim 6 in which the liquid sodium polymer of butadiene is a copolymer of 60 to 100% butadiene-1,3 and 0 to 40% styrene.

8. A process for preparing a stabilized coating composition which comprises the steps of preparing a dispersion of a protein in an alkaline medium, adding to the dispersion so prepared a dispersion of a pigment in water, stirring the mixture and thereafter adding a mixture of a liquid sodium polymer of butadiene and a higher fatty acid and agitating until an emulsion is formed.

9. A color stable, wash resistant emulsion paint comprising a hydrophobe phase containing a liquid sodium polymer of butadiene having a Staudinger molecular weight of about 2,000 to 5,000 which is dispersed in a continuous aqueous phase containing about 8 to 12 wt. percent of a proteinaceous protective colloid based on the liquid polymer and about 1 volume of pigment per volume of liquid polymer.

10. An emulsion paint according to claim 9 in which there is an emulsifier which is a soap of a higher fatty acid.

11. An emulsion paint according to claim 9 in which the protective colloid is a protein.

References Cited in the file of this patent

UNITED STATES PATENTS

| | | |
|---|---|---|
| 2,138,226 | Dales | Nov. 29, 1938 |
| 2,192,318 | Kirby | Mar. 5, 1940 |
| 2,194,958 | Szegvari et al. | Mar. 26, 1940 |
| 2,279,387 | Cheetham | Apr. 14, 1942 |
| 2,330,504 | Mack | Sept. 28, 1943 |
| 2,379,402 | Scholz | June 26, 1945 |
| 2,500,983 | Frolich | Mar. 21, 1950 |
| 2,581,413 | Hillyer et al. | Jan. 8, 1952 |
| 2,595,797 | Leyonmark et al. | May 6, 1952 |
| 2,652,342 | Gleason | Sept. 15, 1953 |